(12) United States Patent
Hennessy et al.

(10) Patent No.: US 6,195,718 B1
(45) Date of Patent: *Feb. 27, 2001

(54) DUAL PCI BRIDGE DOCKING

(75) Inventors: Richard Hennessy, Worcester, MA (US); John Mallard, Saratoga, CA (US)

(73) Assignee: Digital Equipment Corporation, Maynard, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,394

(22) Filed: Sep. 9, 1997

(51) Int. Cl.[7] .................................................. G06F 13/00
(52) U.S. Cl. ........................................... 710/102; 710/129
(58) Field of Search .................................. 710/102, 103, 710/128, 129

(56) References Cited

U.S. PATENT DOCUMENTS

| | | | | |
|---|---|---|---|---|
| 5,311,397 | * | 5/1994 | Harshberger et al. | 361/683 |
| 5,584,030 | * | 12/1996 | Husak et al. | 713/300 |
| 5,724,529 | * | 3/1998 | Smith et al. | 710/129 |
| 5,784,576 | * | 7/1998 | Guthrie et al. | 710/103 |
| 5,793,987 | * | 8/1998 | Quackenbush et al. | 710/100 |
| 5,805,412 | * | 9/1998 | Yanagisawa et al. | 361/686 |
| 5,873,000 | * | 2/1999 | Lin et al. | 395/892 |
| 5,875,307 | * | 2/1999 | Ma et al. | 710/101 |

FOREIGN PATENT DOCUMENTS

| | | |
|---|---|---|
| 0674275 | 9/1995 | (EP) . |
| 0772134 | 5/1997 | (EP) . |

OTHER PUBLICATIONS

*Hot docking PCI–to–PCI has link to ISA past,* Electronic Engineering, vol. 67, No. 827, Nov. 1995, p. 14.
*PCI System Architecture,* Shanley & Anderson, Nov. 1995, pp. 381–386, figures 19–1, 19–2.

* cited by examiner

*Primary Examiner*—David A. Wiley
(74) *Attorney, Agent, or Firm*—Conley, Rose & Tayon, P.C.

(57) ABSTRACT

A multiple docking system allows multiple dock units to be connected to the bus of a primary unit notebook computer. This is accomplished using multiple bridges between the primary bus of the primary unit and secondary buses in each of the dock units. Importantly, the system allows for hot docking or docking of the multiple dock units to the primary unit while the primary unit is operational. It accomplishes this, however, without the latency impact associated with buffers on the primary bus. Instead, a docking signal is generated to a bridge in first dock unit as the second dock unit is docked. This causes the bridge to complete bus transactions between the primary bus and the first dock unit's secondary bus. The bridge also generates a float request signal to the primary unit and then floats the secondary bus only after receiving a float grant signal back.

14 Claims, 3 Drawing Sheets

DUAL PCI BRIDGE DOCKING

BACKGROUND OF THE INVENTION

Computers have been designed with accessible bus connectors that provide external electrical connections to their buses. This configuration is most common in portable and specifically notebook-size computers and is used in two scenarios. The bus connector may be used to connect the portable computer to a non-portable docking station that many times allows connection to a larger display and a full size keyboard. In other implementations, the bus connector is adapted to be connected to somewhat portable dock units that can contain hard drives, CD ROMS, and power supplies. Compatible dock units are available that have larger battery power supplies, CD ROMS, and other capabilities for multimedia functions, for example.

One issue that arises when providing this docking capability is how to handle the physical electrical mating between the computer, or primary unit, and the dock unit. Glitches or anomalous voltages will arise on the primary bus when the primary bus makes electrical contact with the corresponding connector on the dock unit's bus extension. Such glitches can cause the primary unit to hang or become inoperable, requiring rebooting.

One solution to handling the docking and the resulting glitches on the bus is to render docking illegal when the primary unit is operational. This solution solves the problem of compensating for the glitches, but is somewhat unacceptable to most users. Another solution is to provide buffers between the primary bus and the primary unit's bus extension. During operation, these buffers act as relay agents that simply pass-on valid bus activity between the primary bus and extension in the dock unit. During docking, however, they prevent the glitches from appearing on the primary unit's bus and, thus, insulate the primary unit. The problem with the buffer solution is two-fold. The buffers: 1) add expense to the primary unit since they represent an additional hardware system; and 2) slow transactions between the primary bus and the dock unit's bus extension.

Another approach is to generate a dock request signal just prior to the physical connection between the primary unit's bus conductors and those of the dock unit; the primary unit electrically floats the primary bus in response to receiving this request signal. The solution, while allowing hot docking or docking while the primary unit is operational, avoids the delay and costs associated with the hardware buffers. The problem, however, is that established protocols do not allow the docking of a second dock unit to dock/primary unit pairs.

SUMMARY OF THE INVENTION

The present invention concerns a multiple docking system that allows multiple dock units to be connected to the bus of a primary unit. This is accomplished using multiple bridges between the primary bus of the primary unit and secondary buses in each of the dock units. Importantly, the system allows for hot docking or docking of the multiple dock units to the primary unit while the primary unit is operational by notifying the dock units that docking is taking place and relaying the information to the primary unit.

In general, according to one aspect, the invention features a multiple dock docking system for a computer system comprising a primary unit having a microprocessor and at least two dock units having bus devices addressable by the microprocessor. The docking system comprises a primary bus of the microprocessor that is accessible to the dock units via a bus connector on the primary unit. Bridges in the dock units, supporting respective secondary buses, electrically interface with the primary bus through the primary unit bus connector.

In one embodiment, the first one of the dock units connects to the primary unit bus connector and a second dock unit connects to a dock unit bus connector on the first dock unit. A primary bus extension passes through the first dock unit from the primary unit bus connector to the dock unit bus connector.

In an alternative embodiment, the bridge of the second dock connects to an auxiliary or secondary bus serviced by a bridge of the first dock unit. As a result, the buses of the dock units are serialized with respect to each other.

In either case, docking a second dock unit to the first dock unit generates a dock signal to the bridge of the first dock unit. The bridge concludes bus activity and sends a float request signal to the primary unit. The primary unit responds with a float grant signal, at which time the bridge floats its secondary bus and the primary unit floats the primary bus.

The invention also relates to an inventive bridge that supports the hot docking of a second dock unit. Specifically, the bridge in the first dock unit is capable of receiving the dock signal, which causes the bridge to complete bus transactions between the primary bus and the first dock unit's secondary bus. The bridge also generates a float request signal to the primary unit and then floats the secondary bus only after receiving a float grant signal back.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
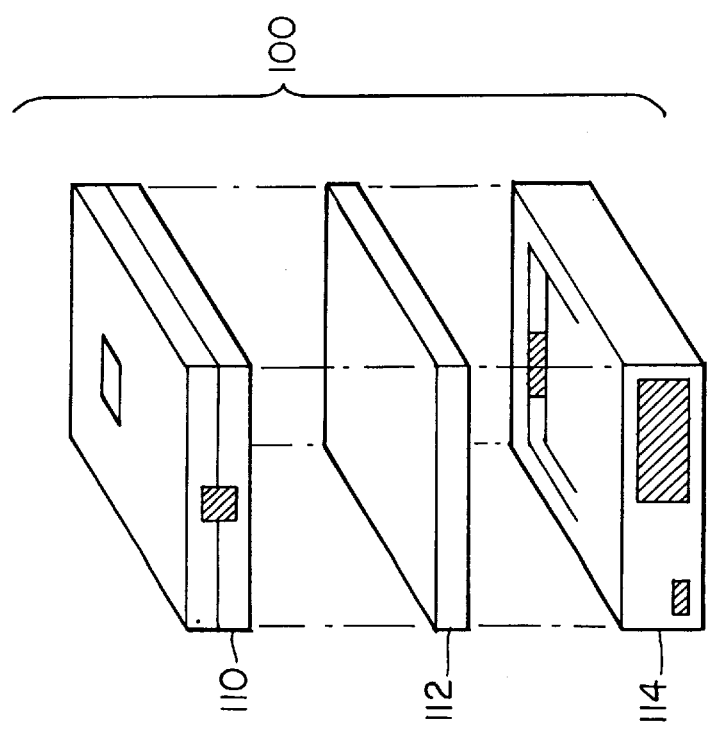
FIG. 1 is a schematic illustration showing a primary unit, notebook computer, being connectable to a first dock unit, which is connectable to a second dock unit.

FIG. 1 illustrates the general scheme for connecting a primary unit 110, or notebook computer, to multiple dock units 112, 114. A first dock unit 112 connects to the bottom of the primary unit 110, and a second dock unit 114 then connects to the bottom of the first dock unit 112.

In one implementation, there are a number of different types of first dock units 112 and other types of second dock units 114. First dock units may be exchanged with each other to provide the total system 100 with different functionality. In the same way, second dock units may be exchanged to provide still different functionality. Also in this implementation, the second dock units 114 may be connected directly to the primary unit 110. It would not be possible, however, to connect two first dock units to each other and to the primary unit or two second dock units 114 to each other and to the primary unit 110.

Figure 2:
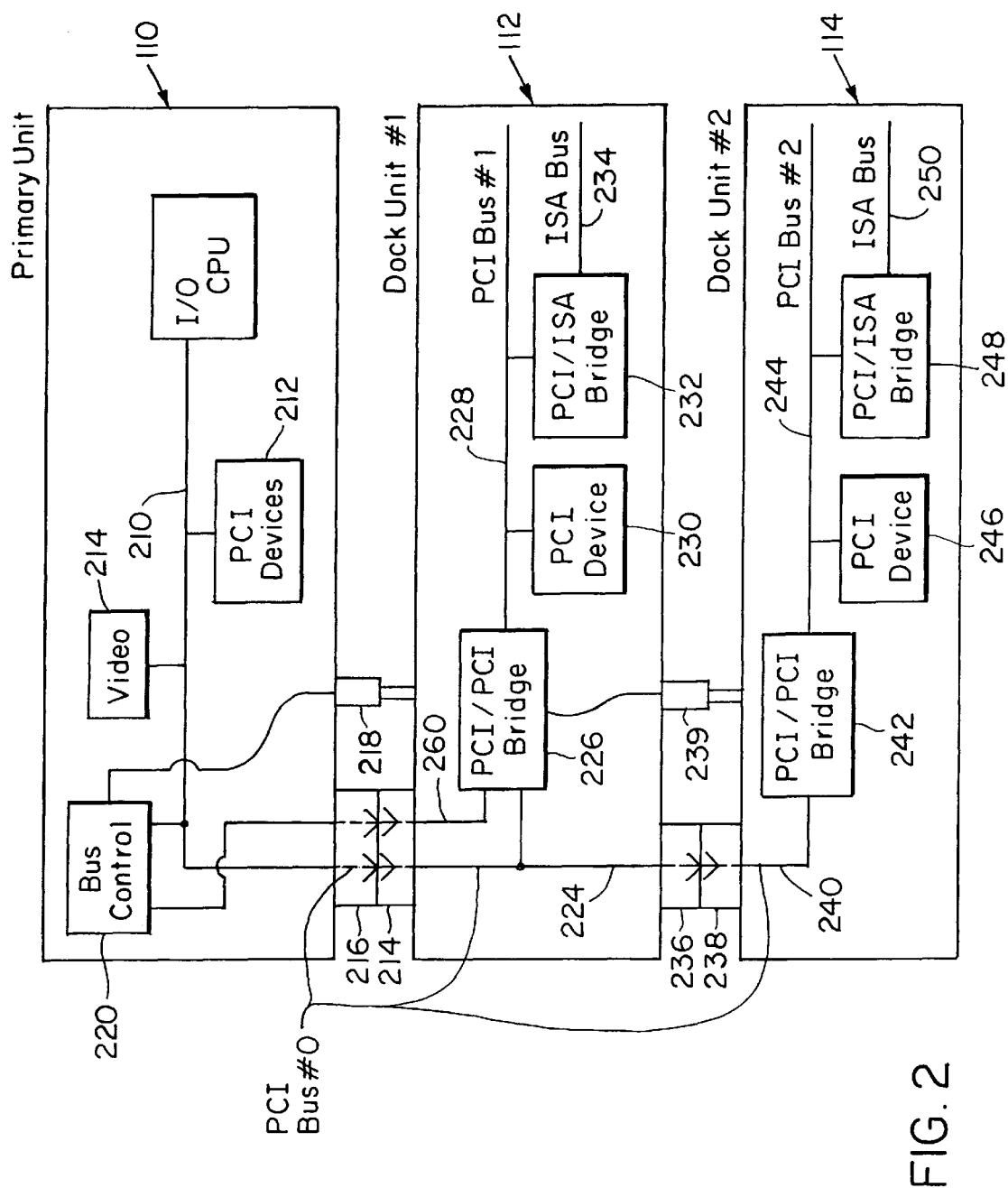
FIG. 2 is a block diagram showing the bus architecture for the primary and dock units according to a first embodiment of the invention.

FIG. 2 is a block diagram illustrating the bus architecture for the computer system. The primary unit 110 has a central processing unit (CPU). Its input/output ports receive and transmit data via a primary PCI bus #0 210. Within the primary unit 110, various PCI devices 212 are connected off of the primary PCI bus #0, such as video devices 214.

The PCI bus #0 210 of the primary unit 110 is accessible externally of the primary unit via a PCI connector 216. In some embodiments, a switch 218 is additionally placed on the bottom of the primary unit to generate a docking-imminent signal to the PCI bus controller 220 in the primary unit. This switch 218 engages the physical case of the dock unit 112,114 as it is being connected to the primary unit 110, but before the conductors of the PCI connector's mate 216. In this way, it provides a signal to the bus controller 220 that docking is taking place.

The first dock unit 112 has a PCI connector 214 that is compatible with the PCI connector 216 of the primary unit 110. When these two connectors mate, the first dock unit's bus 224 is connected as an extension of the primary bus #O.

A bridge 226 in the first dock unit 112 connects the extension 224 of the bus #0 to a secondary or auxiliary bus #1 228. In the preferred embodiment, this bus #1 228 is a PCI-type bus. And, PCI devices 230 are installed in the first dock unit 112. Additionally, a PCI/ISA bridge 232 may be provided to support an ISA-type bus 234.

The first dock unit 112 has its own PCI bus connector 236. For the primary bus #0 extension 224 in the first dock unit 112. Additionally, in one embodiment the first dock unit has a switch 239 on its bottom face to generate a docking-imminent signal just before the second dock unit 114 connects to PCI bus extension 224.

The second dock unit 114 has a compatible PCI bus connector 238 to the PCI bus connector 236 on the bottom of the first dock unit 112. Preferably, the PCI bus connector 238 of the second dock unit 114 is also compatible with the PCI connector 216 of the primary unit 110.

Electrical mating between the PCI bus connector 238 of the second dock unit 114 and the bottom PCI bus connector 236 of the first dock unit 112 connects the bus #0 extension 224 in the first dock unit 112 to a second bus extension 240 of bus #0 in the second dock unit 114. A second PCI/PCI bridge 242 is provided in the second dock unit to act as agent between the second extension 240 of bus #0 in the second dock unit and bus #2 244 in the second dock unit. Similar to the first dock unit, bus #2 may service PCI devices 246 or have a PCI/ISA bridge 248 to support ISA-type bus 250.

The first and second PCI/PCI bridges 226,242 act as agents for the devices behind them. For example, the first PCI/PCI bridge 226 serves as an agent for the devices 230 connected off of the auxiliary PCI bus #1 228. In one implementation, the first PCI/PCI bridge is programmed as a positive decode agent. It regenerates cycles appearing on bus #0 onto auxiliary bus #1 228 and claims those cycles when one of its devices requests access to the bus. The second PCI/PCI bridge 242 is programmed as a subtractive decode agent to claim bus cycles on bus #0 that would otherwise go unclaimed.

According to the present invention, the second dock is connectable to the first dock while both the first dock and primary unit are operational. This is accomplished by generating a dock-imminent signal from the second dock unit to the first PCI/PCI bridge 226 in the first dock unit. In the illustrated embodiment, this signal is generated by the switch 239 on the bottom of the dock unit that is activated by the housing of the second dock unit just before the mating between the PCI connectors 236, 238 of the first and second dock units.

Under normal activity, PCI/PCI bridge 226 in the first dock unit 112, pulls in data from the primary bus #0 in burst mode and passes the data through its buffers to the secondary bus 228. The closing of the second switch 239 on the first dock unit 112, however, generates the dock-imminent signal to the bridge 226. The first bridge 226 in response flushes all bus activity. If there is a bus master downstream that currently owns the bus, it is forced off the bus and the buffers cleared. This results in the bridge flushing all activity and prohibiting any downstream devices from obtaining bus mastership.

The PCI/PCI bridge 226 in the first dock unit also notifies the bus controller 220 in the primary unit of the imminent docking situation. Specifically, bridge 226 issues a float request to the bus controller 220 in the primary unit 110. This signal is transmitted on a separate line 260. Before floating the PCI bus #1, however, bridge 226 will wait for a float grant signal back from the bus controller 220. This is a safeguard in the situation in which the bus controller 220 is sending information to bridge 226. When the float grant signal is issued and received, the bus controller 220 floats the primary bus #0 and bridge 226 floats bus #1.

Figure 3:
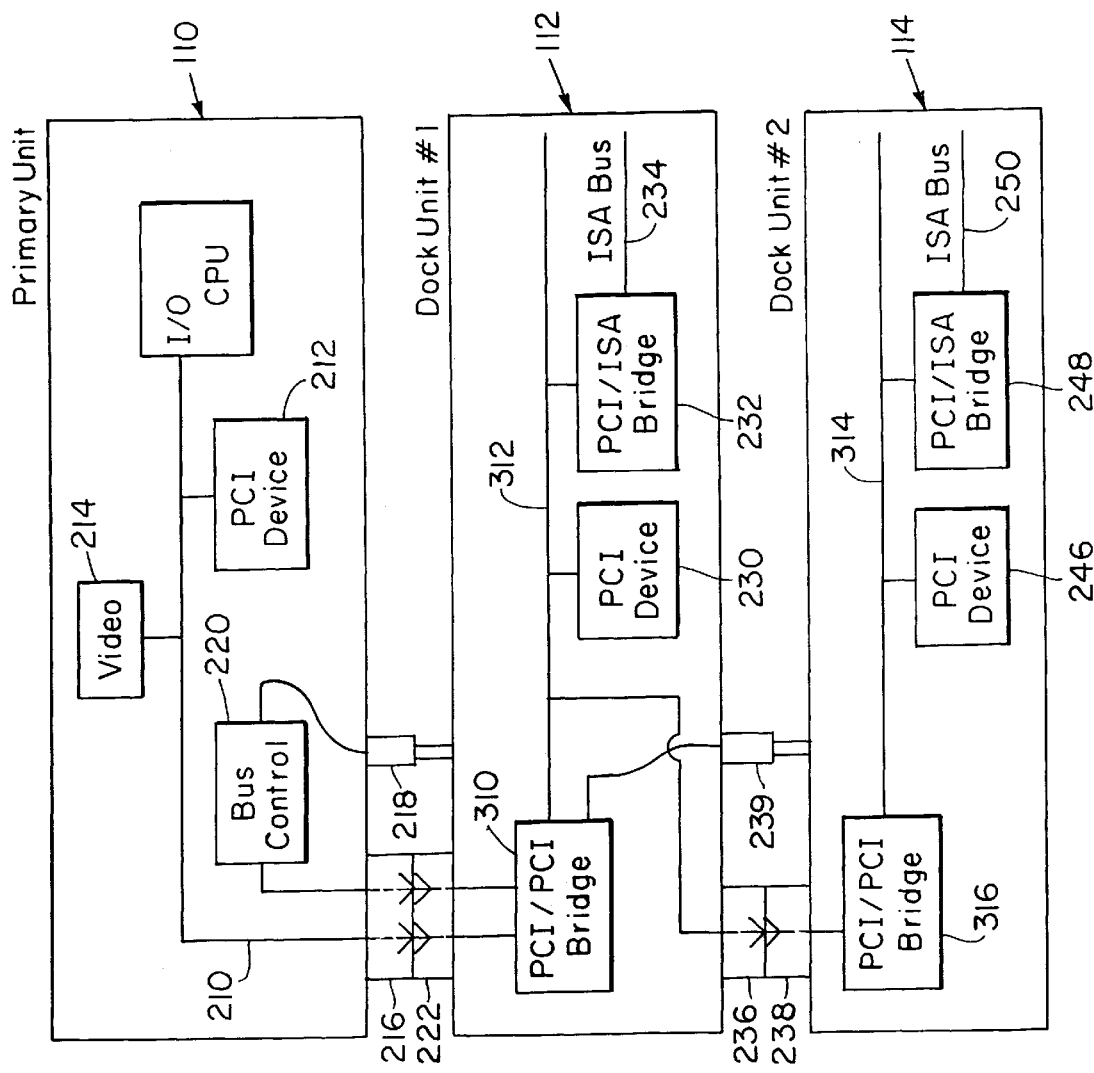
FIG. 3 is a block diagram showing the bus architecture for the primary and dock units according to a second embodiment of the invention.

FIG. 3 illustrates another scheme for connecting a primary unit 110, or notebook computer, to multiple dock units 112, 114, according to a second embodiment of the invention. As in the first embodiment, the first dock unit 112 connects to the bottom of the primary unit 110, and the second dock unit 114 connects to the bottom of the first dock unit 112. The primary unit 110 has a CPU, an input/output port of which receives and transmits data by a primary PCI bus #0 210. PCI bus #0 of the primary unit 110 is accessible externally via a PCI connector 216.

The second embodiment differs in that the main PCI bus #0 210 is not extended through each of the dock units 112, 114. Instead, a first PCI/PCI bridge 310 in the first dock unit 112 receives the PCI bus #0 via the first dock connector 222. The first PCI/PCI bridge 310 supports a first secondary or auxiliary PCI bus #1 312 servicing any PCI devices 230 or optionally a PCI/ISA bridge 232 in the first dock unit 112. This first auxiliary bus 312, however, is made available via a PCI connector 236 on the bottom of the first dock unit 112. In contrast, in the first embodiment, an extension of the primary bus #0 was made available.

The second dock unit 114 has a compatible PCI bus connector 238 that connects the first auxiliary bus #1 to a second PCI/PCI bridge 316 in the second dock unit 114. The second PCI/PCI bridge 316 supports a second auxiliary bus #2 314 to which additional PCI devices 246 are connected and/or a second PCI/ISA bridge 248.

The second embodiment supports the connection of the second dock unit 114 to the first dock unit and primary unit 110 while they are operational. This is accomplished by generating the dock-imminent signal from the second dock unit 114 to the first PCI/PCI bridge 310. This signal may be generated by the switch 239 on the bottom of the first dock unit 112 that is activated by the housing of the second dock unit 114 just before mating between the PCI connectors 236/238 of the first and second dock units. Generation of the dock-imminent signal to the first PCI/PCI bridge 310 causes this bridge to terminate and flush all bus activity on auxiliary bus #1 312. As in the first embodiment, it also generates a float request signal to the bus controller 220 in the primary unit 110. Upon receiving a float-grant signal back, the first PCI/PCI bridge 310 floats the first auxiliary bus 312 while the bus controller 220 floats the primary PCI bus #O.

The serialization of the bridges in the second embodiment yields certain advantages and disadvantages. There is reduced performance for the second PCI/PCI bridge 316 because it is behind the first PCI/PCI bridge 310. The second embodiment, however, reduces the concern about signal integrity resulting from connection to primary PCI bus #0 by the second dock unit.

Figure 4:
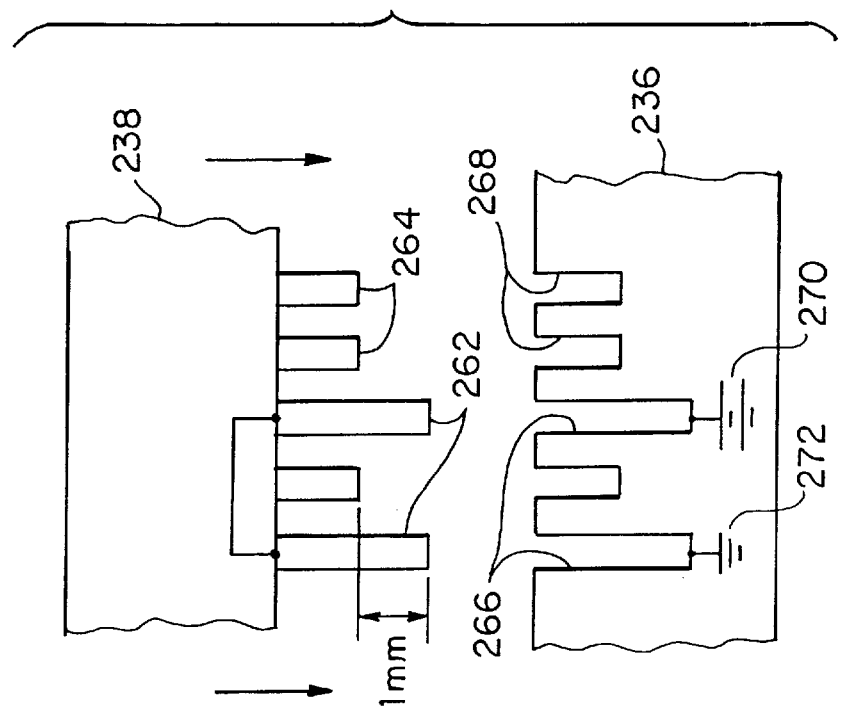
FIG. 4 is a cross-sectional view showing one embodiment of the connectors between the primary unit and dock units and between dock units that generate a dock-imminent signal.

FIG. 4 shows another option for generating the dock-imminent signal. The bus connector 238 on the top of the second dock unit 114 is provided with pins 262, 264 that are adapted to make electrical contact with receptacles 266, 268 in the connector 236 on the bottom of the first dock unit 112. According to the invention, the pins on the male connector comprise longer pins 262 and shorter pins 264. The longer pins 262 are used to generate the dock-imminent signal, and the shorter pins 264 are the PCI bus pins.

In one implementation, the two longer pins 262 are electrically shorted to each other, and the longer pins exceed the length of the shorter pins by one millimeter (mm). Corresponding receptacles 266 on the female connector 236 are connected to ground and a voltage source, respectively. Thus, when the male connector 238 is first connected to the female connector 236 so that the longer pins 262 make electrical contact with the corresponding receptacles 266, current flows between the voltage source 270 and the ground 272. This current is detected and used to generate the dock-imminent signal.

Tests have shown that longer pins with a length of 1 mm greater than the shorter pins can generate the dock-imminent signal 200 microseconds before the PCI pins 264 make electrical contact with the corresponding receptacles 268 in the worst case scenario. This is sufficient time for the bridge and bus controller to flush activity and float their respective buses so that the computer will not hang during hot docking to the PCI bus.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A multiple dock docking system for a computer system comprising a primary unit having a microprocessor and at least two dock units having bus devices addressable by the microprocessor, the docking system comprising:

a primary bus of the microprocessor that is accessible to the dock units via a bus connector on the primary unit;

bridges in the dock units, supporting respective secondary buses, each bridge in each dock unit electrically interfaces with the primary bus; and wherein a first one of the dock units connects to the primary unit bus connector and a second one of the dock units connects to a dock unit bus connector on the first dock unit, the primary bus of the microprocessor passing from the primary unit bus connector to the dock unit bus connector.

2. The docking system described in claim 1, wherein docking a second dock unit to the first dock unit generates a dock signal to the bridge of the first dock unit.

3. The docking system described in claim 2, wherein the bridge of the first dock unit completes bus transactions between the primary bus and the secondary bus of the first dock unit in response to receiving the dock signal.

4. The docking system described in claim 3, wherein the bridge of the first dock unit electrically floats the secondary bus in response to receiving the dock signal.

5. The docking system described in claim 3, wherein the bridge of the first dock unit generates a float request signal to the primary unit in response to receiving the dock signal.

6. The docking system described in claim 5, wherein the bridge of the first dock unit floats the secondary bus only after receiving a float grant signal from the primary unit.

7. The docking system described in claim 6, wherein the primary unit electrically floats the primary bus in response to receiving the float request signal from the first dock unit.

8. The docking system described in claim 1, wherein the primary bus is a PCI-type bus.

9. In a computer system having a primary unit and a first dock unit which is docked to the primary unit, a process for docking a new dock comprising:

generating a dock signal to the first dock unit in response to docking between the first dock unit and the new dock unit;

generating a float request signal from the first dock unit to the primary unit; and electrically floating a primary bus of the primary unit in response to the float request signal from the first dock unit; and electrically connecting the new dock unit to the primary bus of the primary unit.

10. The process described in claim 9, further comprising purging bus transactions in a bridge of the first dock unit.

11. The process described in claim 10, wherein purging the bus transaction comprises concluding current bus transactions and prohibiting future requests for the bus.

12. The process described in claim 9, further comprising connecting the bridge of the new dock unit to an extension, in the first dock unit, of a primary bus of the primary unit.

13. The process described in claim 9, further comprising connecting the bridge of the new dock unit to an auxiliary bus of the first dock unit.

14. The docking system of claim 2 further comprising:
a bus connector having:
at least one longer pin adapted to electrically generate the dock signal; and
shorter pins adapted to transmit bus signals.

* * * * *